Feb. 16, 1937.  J. S. WATTS  2,071,095
LIQUID MIXING DEVICE
Filed June 18, 1931
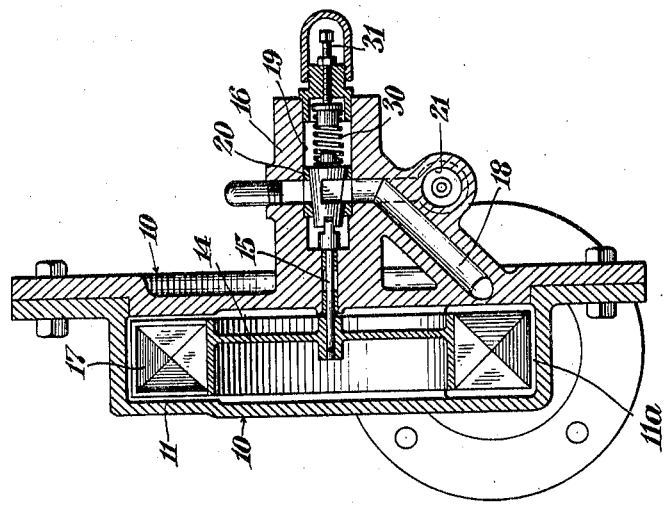
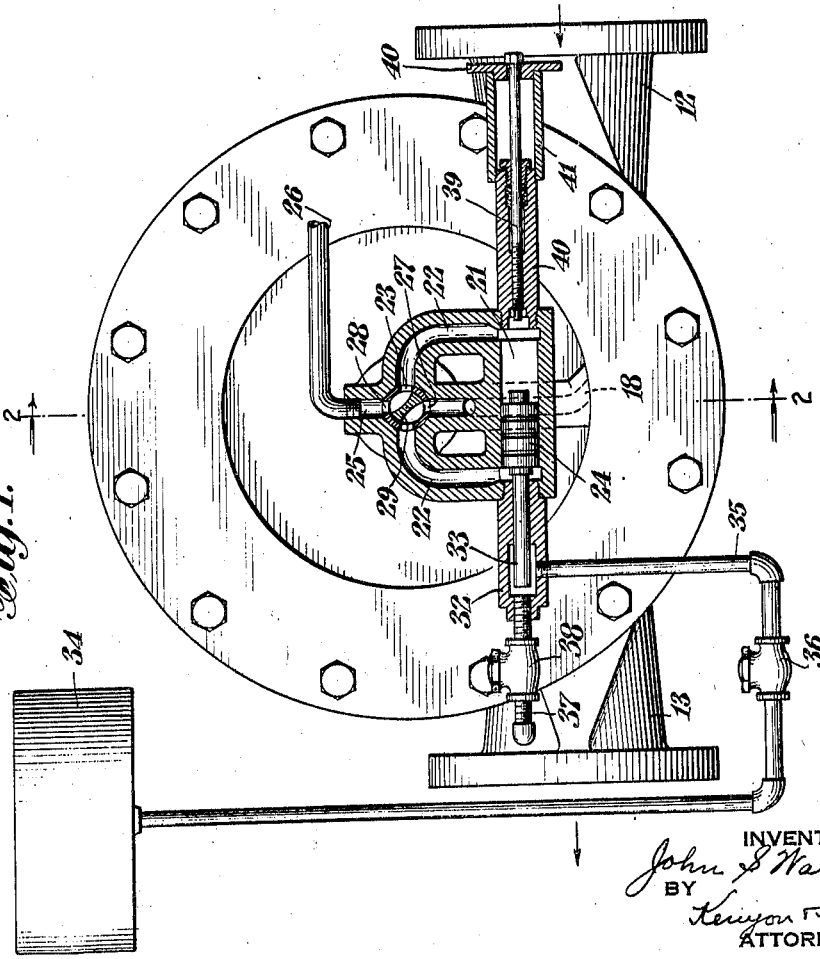
INVENTOR
John S. Watts
BY
Kenyon & Kenyon
ATTORNEYS.

Patented Feb. 16, 1937

2,071,095

UNITED STATES PATENT OFFICE 2,071,095

LIQUID MIXING DEVICE

John S. Watts, East Orange, N. J.

Application June 18, 1931, Serial No. 545,154

3 Claims. (Cl. 137—165)

This invention relates to liquid mixing devices, and has for an object a device which will add to a continuously flowing stream of one liquid a definite proportionate amount of another liquid.

According to this invention, the liquid stream to which additions are to be made is caused to flow through a casing in which is mounted a rotor operable by the stream. A small stream, preferably a branch stream diverted from the main stream, is supplied to a hydraulic engine, the operation of which is controlled by a valve actuated by said rotor. The hydraulic engine embodies a pump by means of which unit quantities of the liquid to be added are successively introduced into the stream flowing from the casing. The ratio of the liquid added to the flowing stream remains constant despite changes in velocity of the flowing stream as the volume of liquid added is proportional to the rotational speed of the rotor.

Other objects, novel features and advantages of this invention will be apparent from the foregoing specification and accompanying drawing, wherein:

Fig. 1 is a plan view partly in section of a device embodying the invention, and Fig. 2 is a section on the line 2—2 of Fig. 1.

The device comprises a two-part casing 10 forming a substantially cylindrical chamber 11 communicating with a tangentially arranged conduit 11a having an inlet 12 and an outlet 13. Within the chamber a rotor 14 is mounted upon a shaft 15 which is journalled in a hub 16 extending from one part of the casing 10. Buckets 17 are mounted on the periphery of the rotor and extend into the conduit 11a. The casing is provided with a passageway 18, one end of which communicates with the chamber 11. The other end of the passageway 18 leads into a tubular chamber 19 in which is mounted a cylindrical valve bushing 20. The casing also is provided with a cylinder 21, the opposite ends of which communicate through conduits 22 and ports 23 with the interior of the valve bushing 20. Within the cylinder 21 is provided a floating piston 24. A conduit 25 is provided leading from the tubular chamber 19 at a point opposite the passageway 18 and communicates with a pipe 26. The passageway 18 communicates with the interior of the valve bushing through a port 27 and the conduit 25 communicates with the interior of the valve bushing through a port 28.

A valve 29 is rotatably mounted in the bushing 20 and is provided with two channels by means of which successive ports in the valve bushing are put into communication with each other. A spring 30 is provided for keeping the valve tightly seated in the bushing and an adjusting screw 31 permits varying the pressure exerted by the spring 30. The valve 29 is coupled to the shaft 15 for rotation with the rotor 14. As the valve rotates communication is alternately established between each end of the cylinder 21 and the passageway 18 as well as between each end of the cylinder and passageway 25.

A pump cylinder 32 is supported by the hub 16 in alinement with the cylinder 21 and a plunger 33 is mounted for reciprocation in said cylinder, the plunger being attached at one end to the piston 24. A tank 34 for the liquid to be added is connected by a pipe 35 with the cylinder 32, the pipe being provided with a check valve 36. A pipe 37 leads from the cylinder 32 into the outlet 13 from the casing and is provided with a check valve 38.

In operation, the rotor 14 is operated by liquid flowing through the conduit 11a and operates the valve 29 to control the operation of the hydraulic engine embodied in the hub 16. By means of the valve 29, the ends of the cylinder 21 are alternately put into communication with the passageways 18 and 25, thereby causing reciprocation of the piston 24 in timed relation to the rotation of the rotor 14. The plunger 33 reciprocates with the piston 24 and at each reciprocation thereof a definite volume of liquid from the tank 34 is pumped through the pipe 37 into the outlet 13. The frequency of reciprocation of the plunger is controlled by the rotational speed of the rotor and the ratio of added liquid to that flowing through the conduit remains constant irrespective of flowing variations.

The volume of liquid added to the flowing stream at each reciprocation of the piston may be varied by changing the length of the stroke of the piston 24. For this purpose there is provided an adjusting screw 39 having an operating button 40. The adjusting screw 39 is threaded into a cylindrical supporting member 40 and carries a sleeve 41 which surrounds the member 40. The member 40 is provided with scale markings which indicate the volume of liquid pumped at each stroke of the plunger 33. By turning the button 40 and operating the scale markings, the amount of liquid added to the flowing stream may be easily and accurately varied.

The above described apparatus insures mixing of two liquids in definite and uniform proportions which proportions may be varied as desired. The amount of liquid added for each rotation of the rotor 14 is the same whatever the speed of the rotor. As the speed of the rotor is directly dependent upon the flow of liquid through the chamber, the ratio of the two liquids brought together by the device remains constant irrespective of variations in rate of flow through the conduit.

It is of course apparent, that various structural modifications may be made in the apparatus above described, without in any way departing from the spirit of the invention as defined in the appended claims.

I claim:

1. An apparatus for adding to a stream of liquid unit quantities of a second liquid in predetermined ratio by volume, said apparatus comprising a conduit through which the stream of liquid flows, a flow-responsive motor arranged in said conduit for operation by said stream of liquid proportional to the rate of flow of said stream, a cylinder, a member mounted in said cylinder for back and forth movement, a valve for alternately supplying liquid under pressure to and discharging liquid from the ends of said cylinder, means connecting said motor and valve whereby the valve is actuated at a frequency proportional to the rate of flow of said stream of liquid to alternately admit liquid under pressure to one end of the cylinder while discharging liquid from the other end, a source of the second liquid, a pump actuated by said member, and connections for said pump whereby successive unit quantities of said second liquid are drawn from said source and discharged into the first liquid in definite ratio to the rate of flow of said stream of liquid through said conduit.

2. An apparatus for adding to a stream of liquid unit quantities of a second liquid in predetermined ratio by volume, said apparatus comprising a conduit through which the stream of liquid flows, a flow-responsive motor arranged in said conduit for operation by said stream of liquid proportional to the rate of flow of said stream, a cylinder, a member mounted in said cylinder for back and forth movement, a valve for alternately supplying liquid from said conduit to and discharging liquid from the ends of said cylinder, means connecting said motor and valve whereby the valve is actuated at a frequency proportional to the rate of flow of said stream of liquid to alternately admit liquid under pressure to one end of the cylinder while discharging liquid from the other end, a source of the second liquid, a pump actuated by said member, and connections for said pump whereby successive unit quantities of said second liquid are drawn from said source and discharged into the first liquid in definite ratio to the rate of flow of said stream of liquid through said conduit.

3. An apparatus for adding to a stream of liquid unit quantities of a second liquid in predetermined ratio of volume, said apparatus comprising a conduit through which the stream of liquid flows, a flow-responsive motor arranged in said conduit for operation by said stream of liquid proportional to the rate of flow of said stream, a cylinder, a member mounted in said cylinder for back and forth movement, a valve for alternately supplying liquid under pressure to and discharging liquid from the ends of said cylinder, means connecting said motor and valve whereby the valve is actuated at a frequency proportional to the rate of flow of said stream of liquid to alternately admit liquid under pressure to one end of the cylinder while discharging liquid from the other end, a source of the second liquid, a pump actuated by said member, and connections between said pump and said source of second liquid and between said pump and said conduit beyond said motor whereby successive unit quantities of the second liquid are drawn from said source and discharged into said liquid stream in predetermined ratio to the rate of flow of said liquid stream.

JOHN S. WATTS.